(12) United States Patent
Brückner et al.

(10) Patent No.: US 7,411,966 B2
(45) Date of Patent: Aug. 12, 2008

(54) METHOD AND SYSTEM FOR COUPLING DATA NETWORKS

(75) Inventors: Dieter Brückner, Zapfendorf (DE); Michael Franke, Erlangen (DE); Franz-Josef Goetz, Heideck (DE); Martin Kiesel, Poxdorf (DE); Dieter Klotz, Fürth (DE); Jürgen Schimmer, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 959 days.

(21) Appl. No.: 10/012,578

(22) Filed: Dec. 5, 2001

(65) Prior Publication Data

US 2002/0131452 A1    Sep. 19, 2002

(30) Foreign Application Priority Data

Mar. 16, 2001  (DE) ............................... 101 13 263
Aug. 21, 2001  (DE) ............................... 101 40 861

(51) Int. Cl.
*H04L 12/28* (2006.01)
(52) U.S. Cl. ........................................ 370/401; 370/465
(58) Field of Classification Search ................. 370/337, 370/347, 401, 465, 468, 470, 471, 474, 503
See application file for complete search history.

(56) References Cited

U.S. PATENT DOCUMENTS

| | | | | |
|---|---|---|---|---|
| 5,506,848 A * | 4/1996 | Drakopoulos et al. | ....... | 370/336 |
| 5,528,513 A | 6/1996 | Vaitzblit et al. | ......... | 364/514 A |
| 5,594,734 A | 1/1997 | Worsley et al. | ............. | 370/395 |
| 5,654,969 A | 8/1997 | Wilhelmsson | ................ | 370/460 |
| 5,742,594 A * | 4/1998 | Natarajan | .................... | 370/336 |
| 6,393,007 B1 * | 5/2002 | Haartsen | ..................... | 370/337 |
| 6,449,273 B1 * | 9/2002 | Jennings, III | ................ | 370/389 |
| 6,625,166 B2 * | 9/2003 | Tsukamoto et al. | ......... | 370/466 |
| 6,891,850 B1 * | 5/2005 | Vandesteeg et al. | ......... | 370/466 |
| 6,894,987 B1 * | 5/2005 | Andersen et al. | ............ | 370/261 |
| 6,975,646 B2 * | 12/2005 | Yamashita | ................... | 370/466 |
| 2001/0024455 A1 * | 9/2001 | Thaler et al. | ................. | 370/503 |
| 2002/0064157 A1 | 5/2002 | Krause | ........................ | 370/393 |

FOREIGN PATENT DOCUMENTS

| | | |
|---|---|---|
| DE | 19881333 | 9/1999 |
| DE | 10058524 | 6/2002 |
| EP | 1024429 | 8/2000 |
| WO | 9909689 | 2/1999 |
| WO | 0003521 | 1/2000 |

\* cited by examiner

*Primary Examiner*—Huy D. Vu
*Assistant Examiner*—Christine Ng
(74) *Attorney, Agent, or Firm*—Baker Botts L.L.P.

(57) ABSTRACT

A method and a system for transmitting data by means of a first data network (1) have first means for transmitting data in at least one first transmission cycle, the first transmission cycle being subdivided into a first area (4) for transmitting real-time-critical data and a second area (5) for transmitting non-real-time-critical data, and by means of a second data network (2) having second means for transmitting data in at least one second transmission cycle, the second transmission cycle being subdivided into a third area (7) for transmitting real-time-critical data and into a fourth area (8) for transmitting non-real-time-critical data, and with a switching unit (13) for transmitting real-time-critical data of the first area into the third area.

18 Claims, 2 Drawing Sheets

METHOD AND SYSTEM FOR COUPLING DATA NETWORKS

CROSS REFERENCE TO RELATED APPLICATION

This application claims priority to German application number 101 13 263.8 filed Mar. 16, 2001 and German application number 101 40 861.7 filed Aug. 21, 2001.

FIELD OF THE INVENTION

BACKGROUND OF THE INVENTION

Data networks provide for communication between a number of users by means of networking, i.e., connecting the individual users to one another. Communication in this context means the transmission of data between the users. The data to be transmitted are sent out as data messages, i.e. the data are packed together to form a number of packets (a/k/a "data pockets") and sent in this form to the corresponding receiver via the data network.

The term transmission of data is here used synonymously with the abovementioned transmission of data messages or data packets. The networking itself is achieved, for example in switchable high-performance data networks (e.g., the Ethernet), in that between two users at least one switching unit is connected to both users. Each switching unit however can be connected to more than two users. Each user is connected to at least one switching unit but not directly to another user. Users are, for example, computers, stored-program controls (SPC) or other machines which exchange and/or process electronic data with other machines. In contrast to bus systems in which each user can directly reach any other user of the data network via the data bus, the switchable data networks are exclusively point-to-point connections, i.e. a user can only reach all other users of the switchable data network indirectly by forwarding of the data to be transmitted by means of one or more switching units.

In distributed automation systems, for example in the field of drive technology, particular data must arrive at the intended users thereof at particular times and be processed by the receivers. These are called real-time-critical data or data traffic since an untimely arrival of the data at the destination leads to unwanted results at the user. According to IEC 61491, EN61491 SERCOS interface—Brief technical description (http://www.sercos.de/deutsch/index_deutsch.htm), a successful real-time-critical data traffic of the said type can be guaranteed in distributed automation systems.

Various standardized communication systems, called bus systems, for the exchange of data between two or more electronic assemblies or devices are known in the prior art, and particularly for use in automation systems. Examples of such communication systems are: field bus, profibus, Ethernet, industrial Ethernet, FireWire, or internal PC bus systems (PCI). These bus systems are in each case designed or optimized for different fields of application and allow a decentralized control system to be built up. Process control and monitoring in automated production and especially in the case of digital drive technologies require very fast and reliable communication systems with predictable response times. A very fast and simple communication can be built up between various assemblies by means of parallel bus systems such as, for example, SMP, ISA, PCI or VME. These known bus systems are used particularly in computers and PCs.

Synchronous clocked communication systems having equidistance characteristics are known from automation technology. These are understood to be systems consisting of at least two users which are connected to one another via a data network for the purpose of mutual exchange of data or mutual transmission of data. The data are exchanged cyclically in equidistant communication cycles which are predetermined by the communication clock used by the system. Users are, for example, centralized automation devices, programming, planning or operating devices, peripheral devices such as input/output modules, drive systems, actuators, sensors, stored-program controls (SPC) or other control units, computers or machines which exchange electronic data with other machines, and particularly process data from other machines. In the text which follows, control units are understood to be closed-loop or open-loop control units of any type.

An equidistant deterministic cyclic data exchange in communication systems is based on a common clock or time base of all components involved in the communication. The clock or time base is transmitted from a designated component (master clock) to the other components. In the case of an isochronous real-time Ethernet, the clock or time base is predetermined by a synchronization master by transmitting synchronization messages.

In German patent application 100 58 524.8, not previously published, a system and a method for transmitting data via switchable data networks are disclosed, which allow a mixed operation of real-time-critical and non-real-time-critical data communication particularly data communication, based on the Internet or Intranet.

SUMMARY OF THE INVENTION

The present invention is based on the object of creating an improved system and method for transmitting data between data networks. The invention allows different data networks to be coupled via a switching unit, e.g. a router, the individual data networks in each case transmitting data in transmission cycles and the transmission cycles being divided into areas for transmitting real-time-critical data and non-real-time-critical data.

In this manner, data networks having the same or different communication protocols can be coupled to one another, e.g. Ethernet data networks, particularly isochronous real-time Ethernet communication systems can be coupled to PROFIBUS data networks; isochronous real-time Ethernet data networks can be coupled to SERCOS data networks, and/or FIREWIRE data networks; or PROFIBUS data networks and/or FIREWIRE data networks can be coupled to SERCOS data networks.

The transmission of data from one data network to the other can relate both to real-time-critical data and to non-real-time-critical data. In a preferred embodiment of the present invention, the ability of transmitting real-time-critical data from one data network into the other is used for transmitting cycle synchronization messages from a master clock of one data network into the other data network in order to also synchronize local relative clocks in the other data network with the aid of the cycle synchronization messages.

In a further preferred embodiment of the present invention, the different data networks in each case have their own master clocks.

In a further preferred embodiment of the invention, non-real-time-critical data are also transmitted from one data network into another, for example for acyclic demand-controlled communication, by allocating different areas in the corresponding transmission cycles. Furthermore, software calls, particularly so-called remote procedure calls (RPC), can also be routed from one network into another in this manner. As a result, server functions in the remote data network can be used.

BRIEF DESCRIPTION OF THE DRAWINGS

The present invention is described in greater detail in the context of exemplary embodiments shown in the drawings, in which.

DETAILED DESCRIPTION OF THE INVENTION

Figure 1:
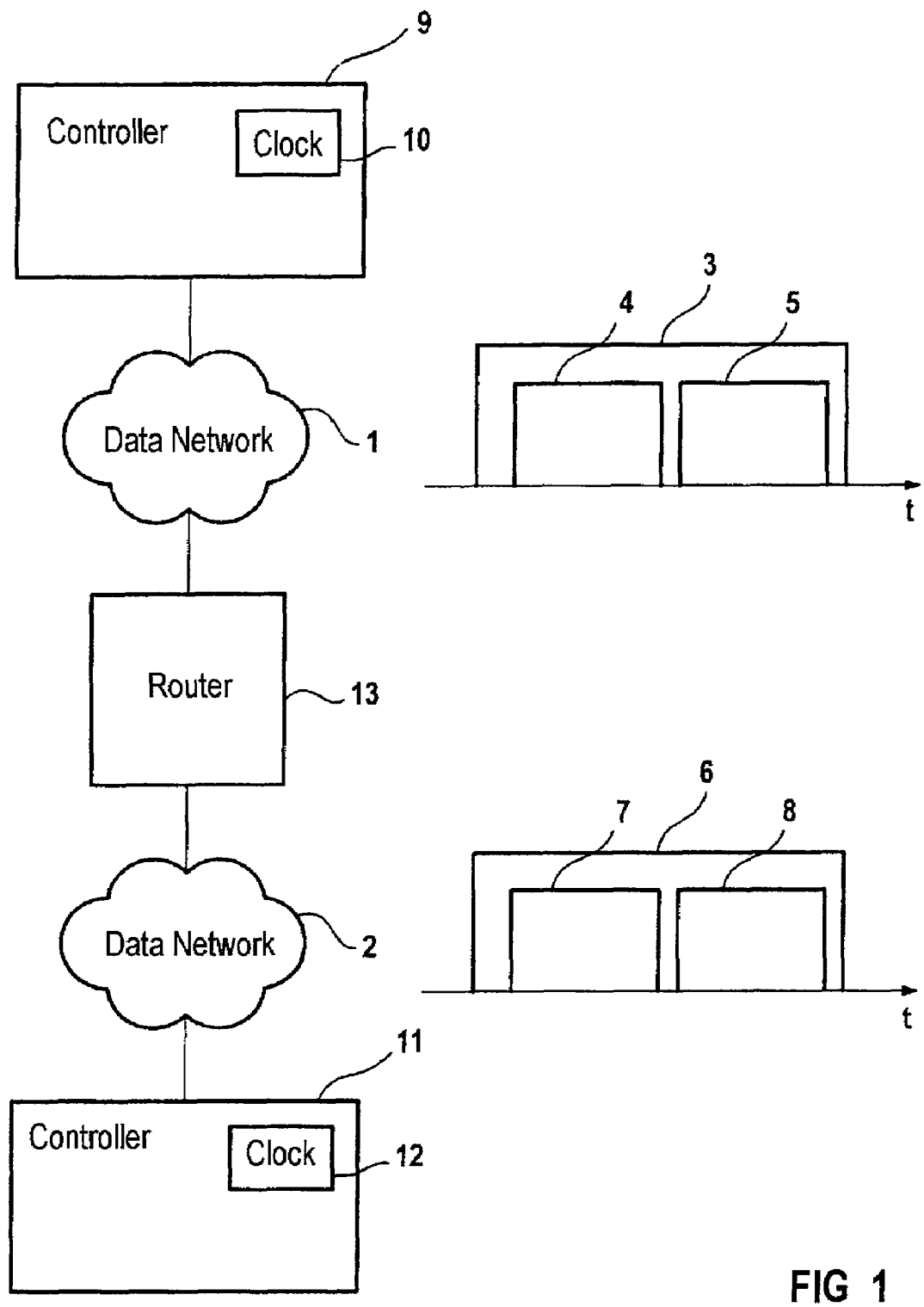
FIG. 1 shows a schematic block diagram of an embodiment of a system according to the invention for the transmission of data.

FIG. 1 shows a system which contains data networks 1 and 2. The data network 1 can be, for example, an isochronous real-time Ethernet, and the data network 2 can be a PROFIBUS network or an isochronous real-time Ethernet, or combinations of SERCOS, FIREWIRE and/or PROFIBUS data networks. In principle, any data networks can be used which allow both the transmission of real-time-critical data and non-real-time-critical data.

For the data transmission in the data network 1, transmission frames 3 are provided. Such transmission frames 3 cyclically follow one another in certain time intervals. Within a transmission frame 3, an area 4 is defined for the transmission of real-time-critical data. In addition, an area 5 is defined in the transmission frame 3 for the transmission of non-real-time-critical data, and in each case for the transmission of such data between users of the data network 1.

The real-time-critical data can be various data messages which are transmitted at defined times between defined users of the data network 1, having in each case fixed addresses. The communication structure between the users of the data network 1, which is determined by these defined data messages, is generally fixed. Only the user data transmitted in each case by the individual data messages change.

In contrast, the non-real-time-critical data which can be transmitted in area 5 of the transmission frame 3 can be acyclic data of a demand-controlled communication. For example, a TCP/IP protocol can be used in the demand-controlled communication.

A corresponding situation applies to the data network 2. This network has transmission frames 6 which correspond to the transmission frames 3 of the data network 1. A transmission frame 6 is in this case subdivided into an area 7 for real-time-critical data and an area 8 for non-real-time-critical data, hence corresponding to areas 4 and 5 of transmission frame 3.

The data network 1 has, for example, a controller 9 which contains a master clock 10. The master clock 10 sends cycle synchronization messages to the users of the data network 1 for synchronizing the local relative clocks in each case existing in the users. A corresponding controller 11 having a master clock 12 also exists for the data network 2.

The data networks 1 and 2 are connected to one another by means of a switching unit, called a router 13. For example, a user of the data network 1 can address another user of the data network 2 by means of its so-called IP address, the IP address being converted into an address of the data network 2, e.g. an Ethernet address, in the router 13.

When a user of the data network 1 sends a data message with real-time-critical data to another user of the data network 2, these data are transmitted in area 4 of transmission frame 3 to the router 13 via the data network 1. The router 13 then identifies the next beginning of a transmission frame 6 of the data network 2 in time, in order to allocate the real-time-critical data from the user of the data network 1 to area 7 of transmission frame 6 so that these real-time-critical data are forwarded to the addressed user of the data network 2 via the data network 2 by means of a corresponding data message.

It is also possible to transmit non-real-time-critical data from a user of data network 1 to a user of data network 2. Here the user of data network 1 transmits a data message with non-real-time-critical data via the data network 1 to router 13. For this purpose, these non-real-time-critical data are allocated to area 5 of transmission frame 3. The router 13 then in turn identifies the next transmission frame of data network 2 in time, in order to allocate the non-real-time-critical data to area 8 so that a corresponding data message is transmitted to the desired user of data network 2.

The length in time of transmission frames 3 and 6 can be different and can also vary. For example, the length in time of the transmission frames can be subject to different periodic changes. For example, the lengths of transmission frames 3 can periodically assume 2 ms, 3 ms and 4 ms periods whilst the period of transmission frames 6 can periodically assume 1 ms, 2 ms and 3 ms periods. However, transmission frames 3 and 6 can also have the same fixed period and/or the same periodicity.

The cycle synchronization messages of the master clock 10 can also be transmitted to the users of data network 2 via the router 13. In this arrangement, the mechanism described above with respect to the transmission of real-time-critical data and non-real-time-critical data can be used. In this case, the master clock 12 is switched off or does not exist. On the basis of this clock synchronization of the users of the data networks 1 and 2, the communication users in both data networks can, e.g. detect actual synchronization values or, respectively, output nominal synchronization values. In this manner, e.g. an isochronous real-time Ethernet can be coupled to a PROFIBUS or SERCOS data network in a particularly advantageous manner.

Due to this clock synchronization between data networks, a relative clock which represents an unambiguous clock time throughout the system can be implemented in each user of data networks 1 and 2. On the basis of this fundamental mechanism, events can thus be detected with a uniform understanding of time in both communication systems or, respectively, time-related switching events can be triggered in one's own data network or another data network. The accuracy of the relative clock corresponds to at least the accuracy of one transmission cycle.

Another advantage of the system of FIG. 1 is that it is also possible to route acyclic demand-controlled communications between data networks 1 and 2. The corresponding communication can take place with proprietary protocols and/or open protocols. Similarly, software calls, particularly so-called remote procedure calls (RPC) can be transmitted between users of the data network 1 and 2 via the router 13. In this manner, it is possible to utilize a server function in the other data network in each case. The router 13 can be constructed in this case as a discrete device or it can also be an integral component of a user of one of the data networks 1 or 2.

The system in FIG. 1 can be advantageously used for monitoring closed-loop control and/or open-loop control at and in packing machines, presses, extrusion machines, textile machines, printing machines, machine tools, robots, handling systems, woodworking machines, glass processing machines, ceramic processing machines and lifting tools (hereinafter "machines").

Figure 2:
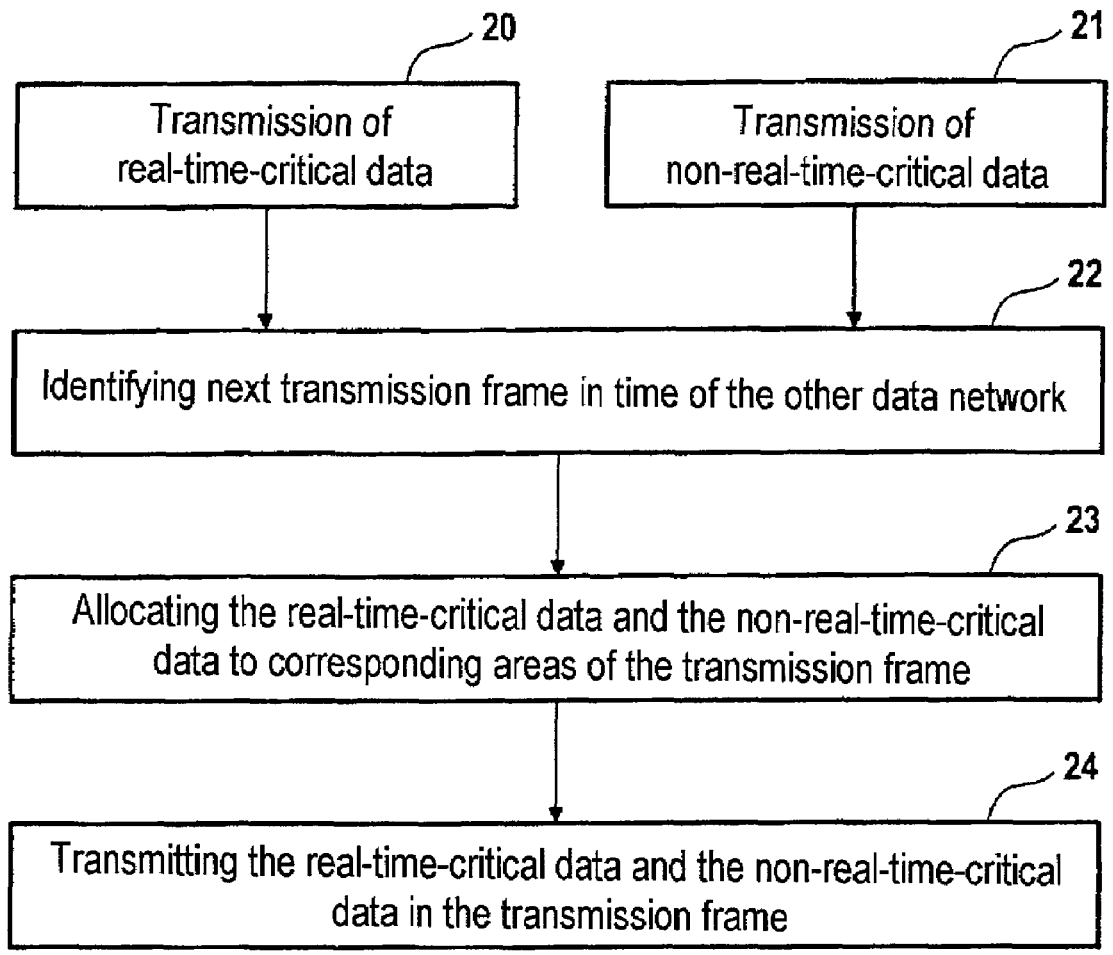
FIG. 2 shows a flowchart of a corresponding method.

FIG. 2 shows a flowchart in which, real-time-critical data is transmitted 20 by a user, for example of data network 1 (compare FIG. 1), in a data message which is directed to a user of another data network (compare data network 2 of FIG. 1). The real-time-critical data are transmitted in the corresponding area of the transmission cycle of the data network.

In step 21, non-real-time-critical data of the same or another user of the data network are transmitted in the corresponding other area of the transmission cycle.

In step 22, the data message or messages of the users of the data network are received by the switching unit, that is to say by the router, and the router identifies the next transmission frame in time in the destination data network.

In step 23, the router allocates the real-time-critical and non-real-time-critical data to the corresponding areas of the transmission frame of the destination data network. In step 24, one or more data messages with the real-time-critical data and the non-real-time-critical data in the corresponding area of the transmission frame are sent off to the relevant user of the destination data network by the router within a corresponding transmission period.

The invention claimed is:

1. An industrial control system for transmitting data by means of a first data network being an isochronous real-time Ethernet and comprising
   means for transmitting data in at least one first transmission cycle within the first data network, said transmission cycle being subdivided into a first area for transmitting real-time-critical data at defined times between defined users and a second area for transmitting non-real-time-critical data,
   means of a second data network having a communication protocol different from that of the first data network and comprising means for transmitting data in at least one second transmission cycle, said transmission cycle being subdivided into a third area for transmitting real-time-critical data and into a fourth area for transmitting non-real-time-critical data,
   a switching unit coupling the first data network and the second data network, wherein the switching unit is operable to identify a next beginning of a second transmission cycle in the second data network for allocating real-time-critical data of the first area into the third area,
   a machine coupled with the second network and being controlled by loop control using said real-time-critical data; and
   a first master clock for the first data network for sending out real-time-critical cycle synchronization messages for synchronizing local relative clocks of users of the first data network, the switching unit transmitting the real-time-critical cycle synchronization messages from the first area of the one transmission cycle into the third area of the second transmission cycle.

2. The system according to claim 1, wherein the second data network is selected from a PROFIBUS data network, a SERCOS data network or a FIREWIRE data network.

3. The system according to claim 1, wherein the transmission cycles have an adjustable time period.

4. The system according to claim 1, wherein the switching unit identifies a second transmission cycle following a first transmission cycle in time and allocates the real-time-critical data of the first area of the first transmission cycle to the third area of the second transmission cycle.

5. The system according to claim 1, wherein the switching unit is capable of transmitting non-real-time-critical data of the second area into the fourth area.

6. The system according to claim 1, wherein the switching unit identifies a second transmission cycle following the first transmission cycle in time and transfers the non-real-time-critical data of the second area into the fourth area.

7. The system according to claim 1, further comprising a second master clock for the second data network for transmitting additional cycle synchronization messages for synchronizing local relative clocks of users of the second data network.

8. The system according to claim 1, wherein the switching unit is capable of transmitting software calls.

9. The system according to claim 1, wherein the machine is selected from the group consisting of packing machines, presses, extrusion machines, textile machines, printing machines, machine tools, robots, handling systems, woodworking machines, glass processing machines, ceramic processing machines and lifting tools.

10. A method for transmitting data of a first user of a first data network being an isochronous real-time Ethernet to a machine coupled with a second data network having a communication protocol different from that of the first data network, comprising the steps of:
    monitoring a loop control using real-time-critical data in the machine coupled with the second data network by transmitting data from the first data network in at least one first transmission cycle which is subdivided into a first area for transmitting real-time-critical data at defined times between the first user and the machine and a second area for transmitting non-real-time-critical data, to the second data network having means for transmitting data in at least one second transmission cycle which is subdivided into a third area for transmitting real-time-critical data and into a fourth area for transmitting non-real-time-critical data,
    transmitting real-time-critical data of the first area of the first transmission cycle to the machine in the third area of a second transmission cycle following the first transmission cycle, and
    synchronizing the second data network by means of a first master clock generated within the first data network, wherein the first data network sends out real-time-critical cycle synchronization messages for synchronizing local relative clocks of users of the first data network, and wherein the switching unit transmits the real-time-critical cycle synchronization messages from the first area of the one transmission cycle into the third area of the second transmission cycle.

11. The method according to claim 10, further comprising selecting the second data network from the group consisting of a PROFIBUS data network, a SERCOS data network or a FIREWIRE data network.

12. The method according to claim 10, farther comprising varying the first and/or second transmission cycles, time period.

13. The method according to claim 10, farther comprising using a transmission cycle which follows the first transmission cycle for transmission of data.

14. The method according to claim 10, further comprising transferring non-real-time-critical data of the second area into the fourth area.

15. The method according to claim 10, further comprising synchronizing local relative clocks of second users via additional cycle synchronization messages of a second master clock of the second data network.

16. The method according to claim 10, further comprising transmitting software calls of first users as non-real-time-critical data from the second area of the first transmission cycle into the fourth area of the second transmission cycle to second users of the second data network.

17. The method according to claim 10, wherein the machine is selected from the group consisting of packing machines, presses, extrusion machines, textile machines, printing machines, machine tools, robots, handling systems, woodworking machines, glass processing machines, ceramic processing machines and lifting tools.

18. A computer program product containing instructions stored on a computer readable medium, the instructions being executable on a computer, wherein the instructions when executed perform the method according to claim 10.

* * * * *